United States Patent
Searls et al.

(10) Patent No.: US 9,262,433 B2
(45) Date of Patent: Feb. 16, 2016

(54) VIRTUALIZATION OF FILE INPUT/OUTPUT OPERATIONS

(71) Applicant: SYMANTEC OPERATING CORPORATION, Mountain View, CA (US)

(72) Inventors: Kirk L. Searls, Maitland, FL (US); Derek Dickinson, Sanford, FL (US)

(73) Assignee: Symantec Operating Corporation, Mountain View, CA (US)

( * ) Notice: Subject to any disclaimer, the term of this patent is extended or adjusted under 35 U.S.C. 154(b) by 0 days.

(21) Appl. No.: 14/538,439

(22) Filed: Nov. 11, 2014

(65) Prior Publication Data
US 2015/0067706 A1   Mar. 5, 2015

Related U.S. Application Data

(63) Continuation of application No. 11/647,796, filed on Dec. 29, 2006, now Pat. No. 8,918,427.

(51) Int. Cl.
*G06F 17/30* (2006.01)
*G06F 9/54* (2006.01)

(52) U.S. Cl.
CPC .......... *G06F 17/30162* (2013.01); *G06F 9/54* (2013.01); *G06F 17/30* (2013.01); *G06F 17/30115* (2013.01); *G06F 17/30233* (2013.01); *G06F 17/30309* (2013.01)

(58) Field of Classification Search
CPC ................................ G06F 17/30; G06F 17/00
USPC .................................................. 707/600–899
See application file for complete search history.

(56) References Cited

U.S. PATENT DOCUMENTS

| | | |
|---|---|---|
| 5,720,026 A | 2/1998 | Uemura et al. |
| 6,732,124 B1 | 5/2004 | Koseki et al. |
| 7,010,721 B2 | 3/2006 | Vincent |
| 7,047,355 B2 | 5/2006 | Nakatani et al. |
| 7,047,380 B2 | 5/2006 | Tormasov et al. |
| 7,373,366 B1 | 5/2008 | Chatterjee et al. |
| 7,392,234 B2 | 6/2008 | Shaath et al. |
| 7,401,093 B1 | 7/2008 | Hamilton et al. |
| 2002/0091903 A1 | 7/2002 | Mizuno |
| 2002/0129132 A1* | 9/2002 | Sato .............................. 709/223 |

(Continued)

OTHER PUBLICATIONS

Microsoft Corp., "Filter Manager Concepts", Microsoft Inc.; Aug. 25, 2006, 5 pages, downloaded from http:l/msdn.microsoft.com/library/defau lt.asp?url=/library/en-us/ifsk _d/hh/1FSK_d/mf_ch1filtermgroverview_78b814d6-c170-43bd-bd13-ba5580643ea6.xml.asp.

*Primary Examiner* — Isaac M Woo
(74) *Attorney, Agent, or Firm* — Meyertons, Hood, Kivlin, Kowert & Goetzel, P.C.

(57) ABSTRACT

Various embodiments of a system and method for providing input/output virtualization for a file are disclosed. The system may include a filter program that intercepts a write request for a particular file and stores change information specifying the data and the write location indicated by the write request. However, the file itself is not modified. The filter program may also intercept a read request referencing the file and determine whether change information representing a write request to write data at the location specified by the read request has been previously stored. If so then the data specified by the change information is returned in response to the read request.

20 Claims, 9 Drawing Sheets

(56) References Cited

U.S. PATENT DOCUMENTS

| | | |
|---|---|---|
| 2006/0069662 A1 | 3/2006 | Laborczfalvi et al. |
| 2006/0070029 A1 | 3/2006 | Laborczfalvi et al. |
| 2006/0070030 A1 | 3/2006 | Laborczfalvi et al. |
| 2006/0074989 A1 | 4/2006 | Laborczfalvi et al. |
| 2006/0075381 A1 | 4/2006 | Laborczfalvi et al. |
| 2006/0085789 A1 | 4/2006 | Laborczfalvi et al. |
| 2006/0090171 A1 | 4/2006 | Laborczfalvi et al. |
| 2006/0174223 A1 | 8/2006 | Muir et al. |
| 2006/0265714 A1 | 11/2006 | Bissett et al. |
| 2007/0067255 A1 | 3/2007 | Bissett et al. |
| 2007/0067321 A1 | 3/2007 | Bissett et al. |
| 2007/0094667 A1 | 4/2007 | Bissett et al. |
| 2007/0245409 A1 | 10/2007 | Harris et al. |
| 2008/0040404 A1 | 2/2008 | Christiansen et al. |

\* cited by examiner

VIRTUALIZATION OF FILE INPUT/OUTPUT OPERATIONS

PRIORITY INFORMATION

This application is a continuation of U.S. patent application Ser. No. 11/647,796, entitled "VIRTUALIZATION OF FILE INPUT/OUTPUT OPERATIONS" filed Dec. 29, 2006.

BACKGROUND OF THE INVENTION

1. Field of the Invention

This invention relates generally to file input/output operations in a computer system.

2. Description of the Related Art

Computer systems generally store data as files organized by a file system. When a software program needs to store data in a persistent or non-volatile manner, the program typically communicates with the file system to store the data in a file on a storage device such as a hard disk drive, tape drive, optical drive, or other storage device operable to store data in a non-volatile manner. To change the data in the file or write new data to the file, the program may issue a write request to the file system. In response, the file system updates the file stored on the storage device to reflect the change.

In some applications it is desirable to simulate the effects of performing write operations that change a file but without actually modifying the file. As one example, consider a system in which a backup copy of a large database file has been stored. It may be desirable to use the backup copy of the database to restore information from the database. However, in order to perform a restore operation, the database management software for some types of database requires change logs to be played or requires other operations that would modify the backup copy of the database. In some applications it may be undesirable to modify the backup copy of the database, e.g., since the backup copy may need to remain in its original state in case it is needed to perform a full recovery of the database. It may also be undesirable to create a new copy of the database from the backup copy for the purpose of performing the restore operation, e.g., since the database may be very large.

SUMMARY

Various embodiments of a system and method for intercepting write requests directed to a file are disclosed. According to one embodiment of the method, a plurality of write requests may be intercepted. Each write request may comprise a request to write data at a respective location in the file. For each of the write requests, change information may be stored in response to the write request. The change information may specify the data and the location indicated by the write request. Storing the change information may record or indicate the write request without modifying the first file.

According to a further embodiment of the method, a read request may be intercepted. The read request may comprise a request to read data at a first location in the file. The method may operate to determine whether first change information representing a write request to write data at the first location has been stored. If so then the data specified by the first change information may be returned in response to the read request.

BRIEF DESCRIPTION OF THE DRAWINGS

A better understanding of the invention can be obtained when the following detailed description is considered in conjunction with the following drawings, in which.

Figure 1:
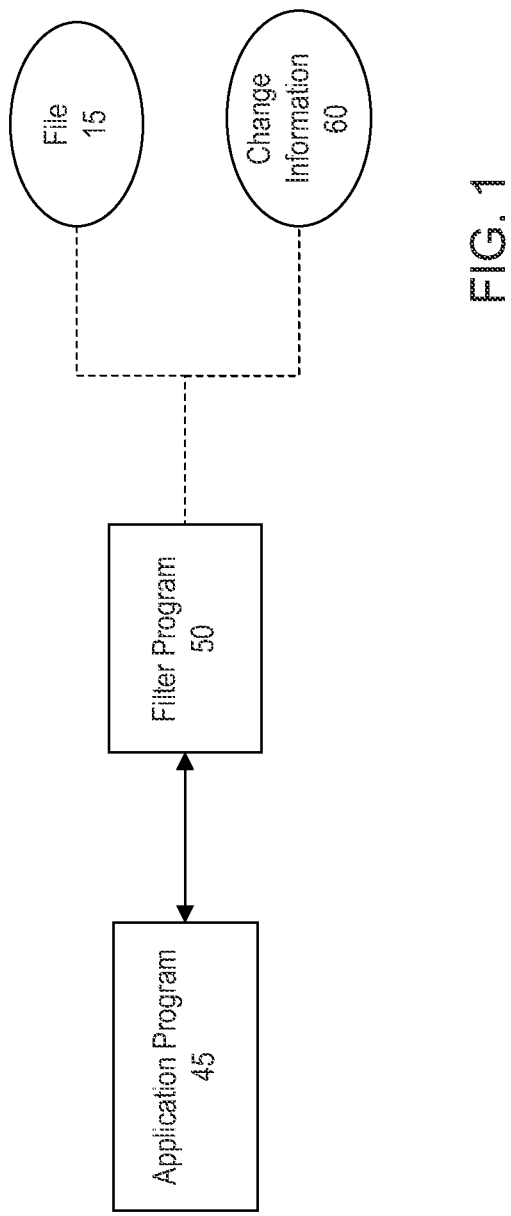
FIG. 1 illustrates one embodiment of a system for providing input/output virtualization for a file.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 illustrates one embodiment of a system for providing input/output virtualization for a file. The system includes a filter program 50 which is operable to intercept input/output (I/O) requests, e.g., write requests and read requests, from an application program 45, where the I/O requests reference a particular file 15. For example, the application program 45 may call a function or method requesting to write data at a particular location or offset in the file 15. The filter program 50 may intercept the write request, and in response may store change information 60 which specifies the data and the write location indicated by the write request. However, the file 15 itself is not modified. For example, the change information 60 may be stored in another file (referred to herein as a "delta file") separate from the file 15, or the change information 60 may be stored in a relational database or other database.

Thus, the filter program 50 may intercept various write requests referencing the file 15 from one or more application programs 45, and for each write request may store a respective portion of change information 60 separately from the file 15, e.g., in a delta file or database. Thus, the write requests are effectively redirected to the delta file or database such that the respective portions of change information 60 record or indicate the data changes specified by the write requests without actually modifying the file 15.

The filter program 50 may also intercept read requests referencing the file 15. For example, the application program 45 may call a function or method requesting to read data at a particular location or offset in the file 15. The filter program 50 may intercept the read request, and in response may search for or determine whether change information 60 representing a write request to write data at the location specified by the read request has previously been stored, e.g., by searching the delta file or database to determine whether a portion of change information 60 representing a write request at the specified location is stored in the delta file or database. If such a portion of change information 60 is found then the data specified by the change information (e.g., the data specified by the previously intercepted write request which the portion of change information 60 represents) may be returned by the filter program 50 to the application program 45.

If such change information 60 is not found then this indicates that no write requests requesting to change data at the location specified by the read request have been intercepted. Thus, in this case, the filter program 50 may read the data from the specified location in the file 15 itself and return the data to the application program 45, or the filter program 50 may forward the read request to file system software which reads the data from the specified location in the file 15 and returns the data to the application program 45.

Figure 2:
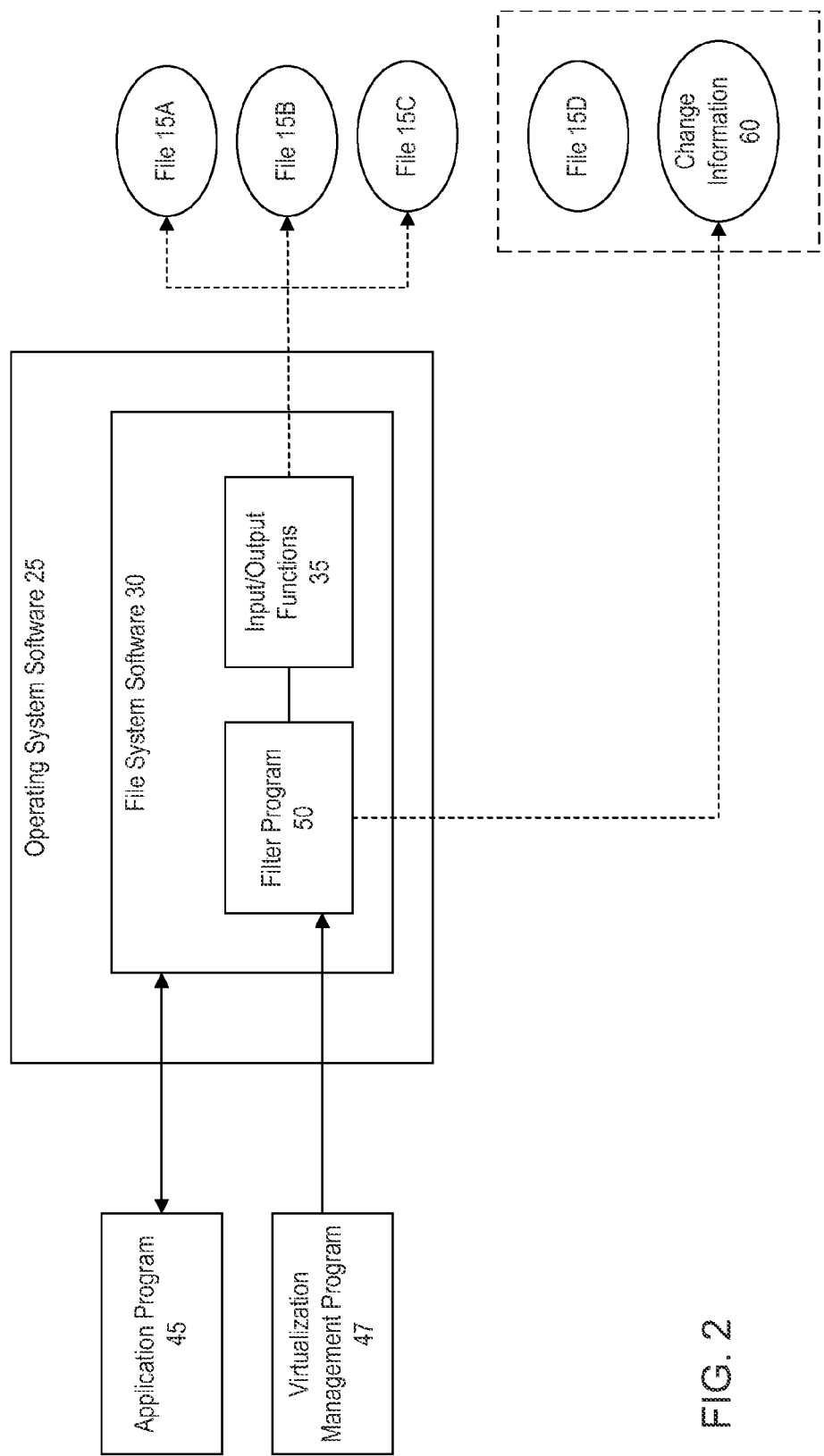
FIGS. 2 and 3 illustrate more detailed embodiments of the system of FIG. 1.

FIG. 2 illustrates a more detailed embodiment of the system of FIG. 1. As well known in the software arts, a computer system typically executes operating system software that performs basic functions required for management and operation of the computer system. The operating system software typically includes file system software which provides application programming interfaces (APIs) that application programs call to perform I/O operations on files. In the embodiment illustrated in FIG. 2, the filter program 50 operates at the level of the file system software. As shown, operating system software 25 includes file system software 30, and the file system software 30 includes the filter program 50.

In some embodiments the filter program 50 may be pre-packaged together with the operating system software 25 and the file system software 30. For example, the filter program 50 may be created by the same organization or vendor that creates the operating system software 25 and file system software 30 and may be installed on the computer system when the operating system software 25 is installed.

In other embodiments, the filter program 50 may not be pre-packaged together with the operating system software 25 and the file system software 30. For example, the filter program 50 may be created by a different organization or vendor than the operating system software 25 and may be installed on the computer system separately from the operating system software 25 and file system software 30. However, the filter program 50 may still be tightly integrated with the file system software 30 and may operate at the level of the file system software 30. For example, the file system software 30 may provide programming interfaces that allow the filter program 50 to be integrated into the file system software 30 in order to intercept file I/O requests as described herein. As one example, where the computer system executes a Microsoft Windows operating system, the filter program 50 may be implemented using a minifilter driver, as discussed in more detail below.

Integrating the filter program 50 with the file system software 30 may enable the I/O requests for a file 15 to be redirected to and from the change information 60 in a manner that is entirely transparent to the application program 45. For example, the file system software 30 may include input/output functions 35 which the application program 45 can call through an application programming interface (API) provided by the file system software 30 in order to perform write requests and read requests for a given file 15. When the application program 45 calls an input/output function 35 of the file system software 30 to perform a write request or read request, the filter program 50 may intercept the request as described above. Thus, in the case of a write request, the write request may be redirected to a delta file or database instead of changing the file 15, unknowingly to the application program 45. Similarly, in the case of a read request, the read request may be satisfied by returning data specified by change information 60 previously stored in the delta file or database instead of from the file 15 itself, unknowingly to the application program 45.

Redirecting write requests and read requests to or from a delta file or database in the manner described above is referred to herein as input/output virtualization. As shown in FIG. 2, in some embodiments the system also includes a virtualization management program 47. The virtualization management program 47 may be operable to turn the input/output virtualization on or off for a given file 15, e.g., by communicating with the filter program 50. For example, it may be desirable to perform input/output virtualization for a given file 15 only at certain times, while at other times allowing I/O operations to be performed directly on the file 15 in the normal manner.

The virtualization management program 47 may also communicate with the filter program 50 to inform the filter program 50 which files 15 to perform input/output virtualization for. For example, the filter program 50 may maintain a list of files for which I/O requests should be filtered as described above and for all other files may allow I/O requests to proceed in the normal manner. For example, in FIG. 2, I/O requests referencing the files 15A, 15B, and 15C proceed in the normal manner, while I/O requests referencing the file 15D are virtualized in the manner described above.

In some embodiments the filter program 50 may intercept all file I/O requests, regardless of whether the I/O requests reference particular files for which input/output virtualization is turned on. For example, the I/O requests referencing files for which input/output virtualization is turned on may be redirected, while I/O requests for other files may be passed on to the input/output functions 35 of the file system software 30. In other embodiments the filter program 50 may be implemented in such a way that only I/O requests referencing files for which input/output virtualization is turned on are intercepted by the filter program 50, and I/O requests referencing other files are not intercepted.

It is noted that in some embodiments the filter program 50 may comprise multiple software components or modules that communicate with each other to perform the functions described above. In some embodiments one or more of the components or modules of the filter program 50 may not operate at the level of the file system software 30. However, the filter program 50 may include at least one component or module that intercepts I/O calls at the file system level, as described above. For example, the filter program 50 may include a first component that operates in kernel mode to intercept I/O requests. If the first component determines that an I/O request references a file for which input/output virtualization is turned on then the first component may notify a second component of the I/O request, where the second component operates in user mode. The second component may then write change information 60 to a delta file or database (in the case of a write request) or read change information 60 from a delta file or database (in the case of a read request), as described above.

Figure 3:
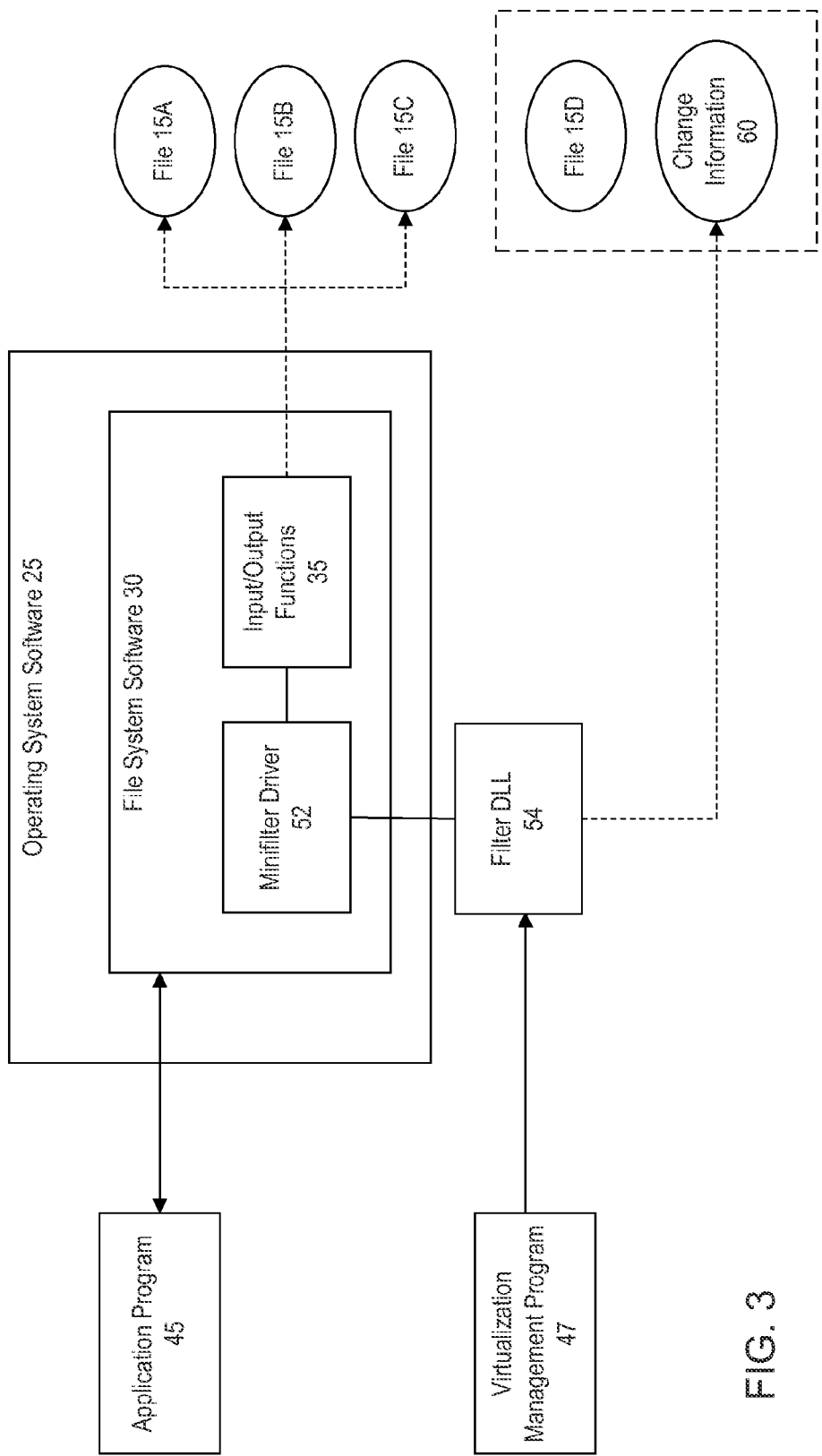

In one embodiment the filter program 50 may operate in a computer system that executes a Microsoft Windows operating system. The file system software provided by the Microsoft Windows operating system enables programs called "minifilter drivers" to be registered with a filter manager. FIG. 3 illustrates an embodiment in which the filter program 50 includes a minifilter driver 52 and a filter dynamic link library (DLL) 54. The minifilter driver 52 may intercept I/O requests and may notify the filter DLL 54 of I/O requests received for the files for which input/output virtualization is turned on. The filter DLL 54 may manage the change information 60 for these files, as described above.

The filter DLL 54 may also be operable to turn the input/output virtualization on or off for particular files, e.g., in response to requests received from the virtualization management program 47. For example, in one embodiment the filter DLL 54 may include an OpenVirt( ) function which the virtualization management program 47 can call to open a virtualization session for a particular file, e.g., to turn on input/output virtualization for the file. The filter DLL 54 may also include a CloseVirt( ) function which the virtualization management program 47 can call to close the virtualization session for the file, e.g., to turn off input/output virtualization for the file.

Figure 4:
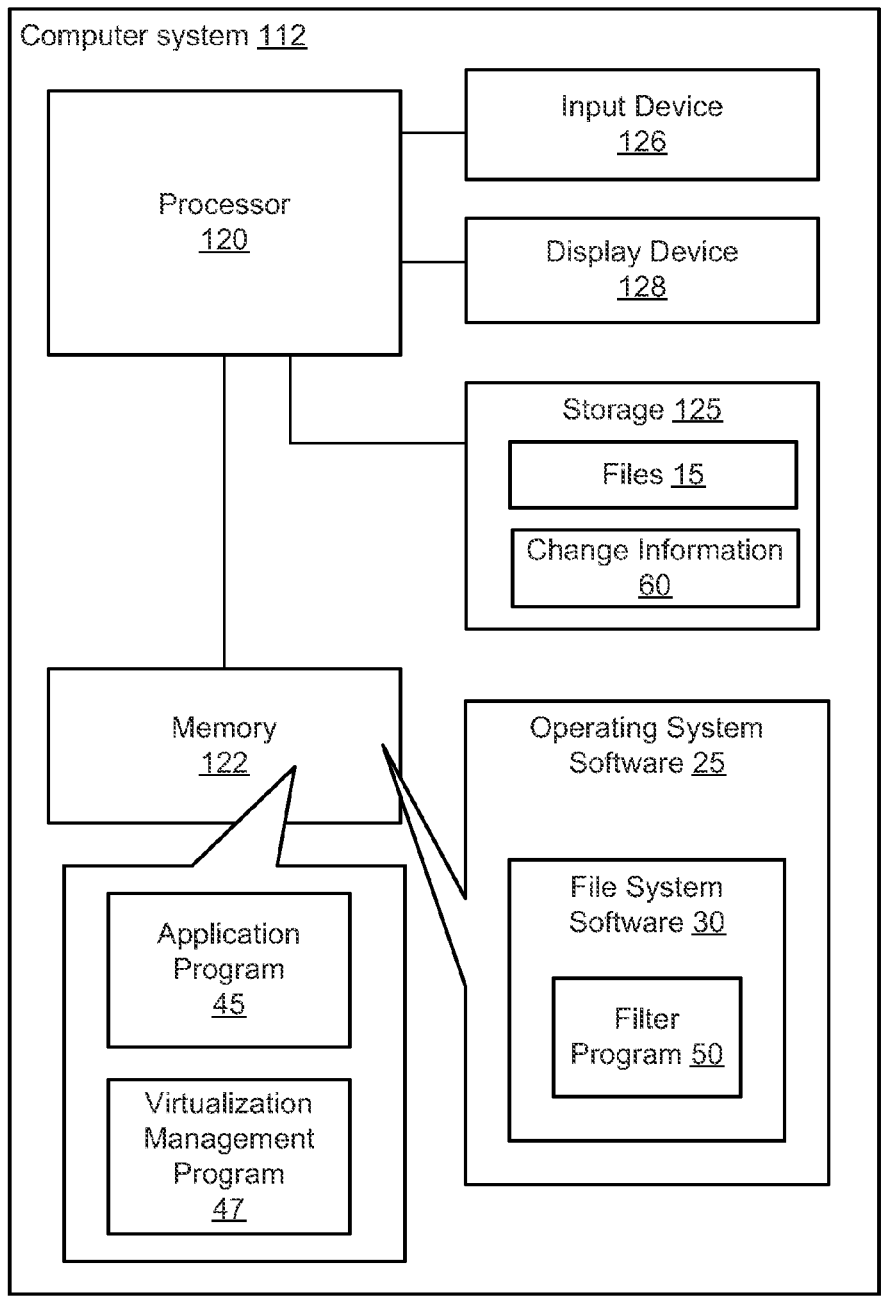
FIG. 4 illustrates an exemplary computer system that may implement embodiments of the input/output virtualization methods described herein.

FIG. 4 illustrates an exemplary computer system 112 that may implement embodiments of the input/output virtualization methods described herein. The computer system 112 includes a processor 120 coupled to a memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store operating system software 25, file system software 30, and the filter program 50. As described above, the file system software 30 may be provided by the operating system software 25, and the filter program 50 may operate at the level of or may be included in the file system software 30. The memory 122 may also store one or more application programs 45 and a virtualization management program 47.

The computer system 112 also includes storage 125, e.g., one or more storage devices configured to store files 15 in a stable or non-volatile manner. As described above, input/output virtualization may be turned on for various ones of the files 15. For each file for which input/output virtualization is turned on, change information 60 may be stored on the storage 125. (Although shown separately from the files 15, in some embodiments the change information 60 may itself be stored as one or more files.) In another embodiment the change information 60 may instead be stored in RAM in the memory 122.

In various embodiments the storage 125 may include any of various kinds of storage devices, such as optical storage devices or storage devices that utilize magnetic media, e.g., one or more hard drives or tape drives. In one embodiment, the storage 125 may be implemented as one or more hard disks configured as a disk storage system. In one embodiment, the disk storage system may be an example of a redundant array of inexpensive disks (RAID) system. In another embodiment, the disk storage system may be a disk array, or Just a Bunch Of Disks (JBOD), (used to refer to disks that are not configured according to RAID). In yet other embodiments, the storage 125 may include RAM disks, for example.

The processor 120 may be configured to execute the software stored in the memory 122. In particular, the processor 120 may execute the filter program 50 to perform the input/output virtualization techniques described herein. It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the computer system 112 may include multiple processors 120.

The computer system 112 also includes one or more input devices 126 for receiving user input from a user of the client computer system 112. The input device(s) 126 may include any of various types of input devices, such as keyboards, keypads, microphones, or pointing devices (e.g., a mouse or trackball).

The computer system 112 also includes one or more output devices 128 for displaying output to the user. The output device(s) 128 may include any of various types of output devices, such as LCD screens or monitors, CRT monitors, etc.

Figure 5:
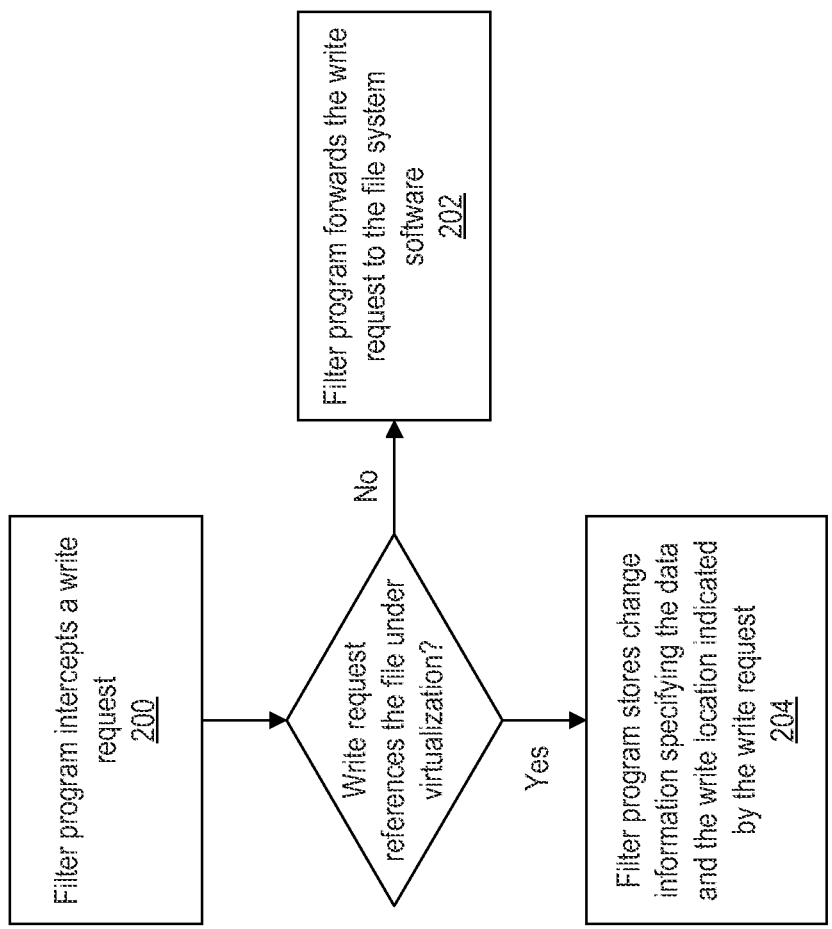
FIG. 5 is a flowchart diagram illustrating one embodiment of a method for virtualizing a write operation directed to a particular file.

FIG. 5 is a flowchart diagram illustrating one embodiment of a method for virtualizing a write operation directed to a particular file. As indicated in 200, the filter program 50 intercepts a write request. As described above, for example, an application program 45 may call an API of the file system software 30 in order to request to write data at a particular location or offset in the file. In response to the application program 45 calling the API of the file system software 30, the filter program 50 may intercept the write request.

The filter program 50 may determine whether the write request references a file for which input/output virtualization is turned on. For example, as described above, a virtualization management program 47 may have previously called the filter program 50 in order to open a virtualization session for one or more files.

As indicated in 202, if the write request does not reference a file for which input/output virtualization is turned on then the filter program 50 may simply forward the write request to the file system software 30 or allow the write request to pass to the file system software 30 without taking any action. The file system software 30 may then write the data specified by the write request to the file in the normal manner.

However, as indicated in 204, if the write request does reference a file for which input/output virtualization is turned on then the filter program 50 may store change information representing the write request, where the change information is stored separately from the file. In this case, the write request is not forwarded to the file system software 30, and the file itself is not changed.

In various embodiments, the change information may be stored in various locations and in various forms. For example, in one embodiment, the filter program 50 may represent changes to the file in a corresponding delta file. For example, in one embodiment, in response to each write request received for the file, the filter program 50 may append a new portion of change information to the end of the delta file. The change information that corresponds to a given write request may specify the data indicated by the write request and the file location or offset at which the data was intended to be written.

In one embodiment, in addition to the delta file which specifies the change information, the filter program 50 may also maintain another file or database that maps offsets of the original file to offsets of the delta file. For example, if a write operation requests data to be written at an offset L1 in the original file, then change information representing the write request may be written at an offset Ll in the delta file. In this example, in addition to writing the change information to the delta file, the filter program 50 may also create an entry in a database which indicates that change information for data at the offset L1 in the original file is located at offset Ll in the delta file. The database entry may subsequently be used to look up the change information in the delta file in response to a read request, as described below.

In another embodiment the filter program 50 may store the change information itself in a relational database or other type of database. For example, in one embodiment, in response to each write request received for the file, the filter program 50 may add a new row to a table in the database, where the row comprises change information representing the write request.

In one embodiment the filter program 50 may represent data changes to the file using blocks of a fixed size. A backfilling technique may be used for write operations of a small size. For example, if data changes are represented using blocks of N bytes and the filter program 50 receives a write request to write data of M bytes, where M is less than N, then the filter program 50 may read an additional N minus M of the original bytes from the file itself in order to fill up the block so that the change information stored for the write request specifies a block of N bytes.

Figure 6:
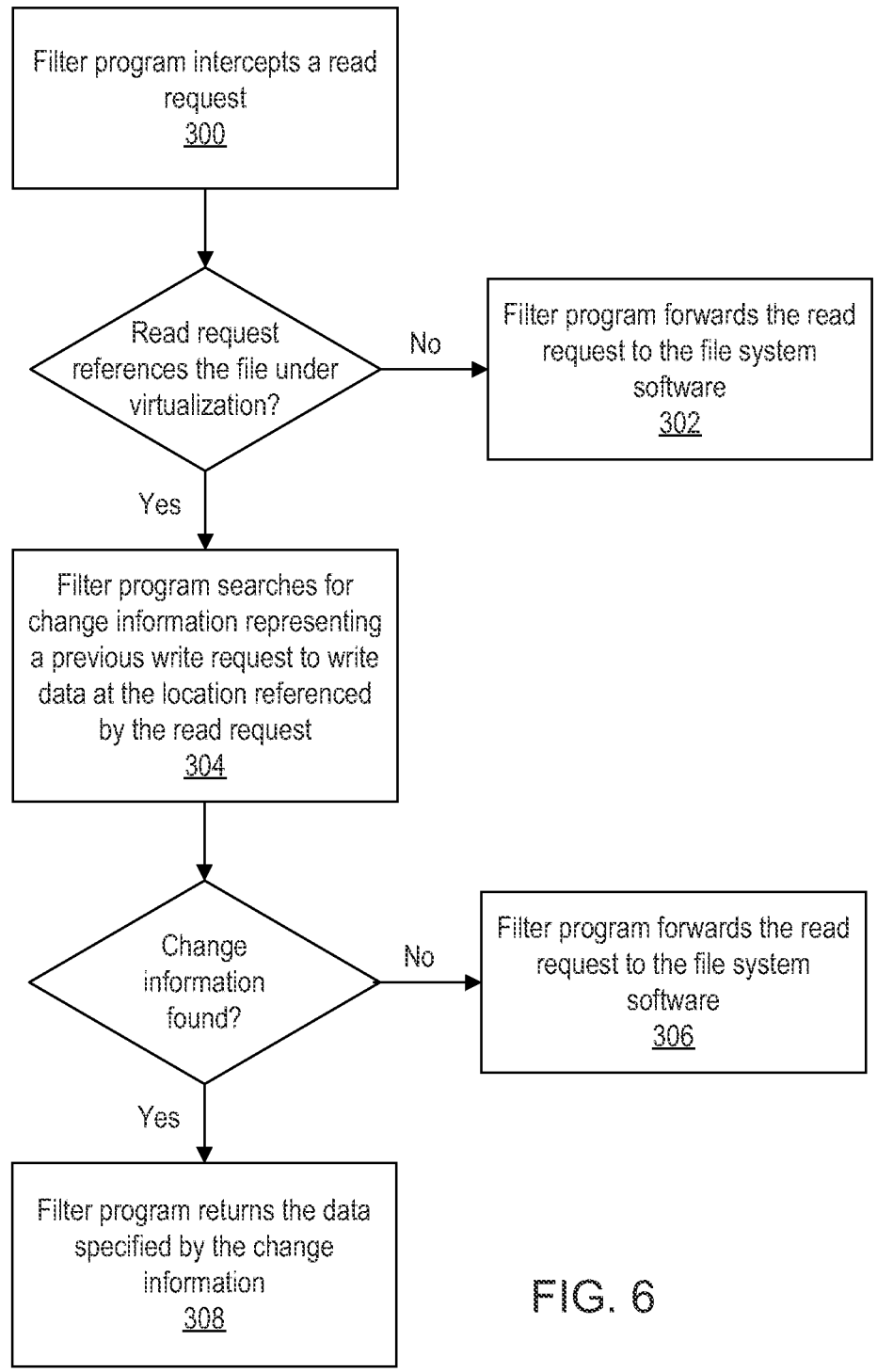
FIG. 6 is a flowchart diagram illustrating one embodiment of a method for virtualizing a read operation directed to a particular file.

FIG. 6 is a flowchart diagram illustrating one embodiment of a method for virtualizing a read operation directed to a particular file, e.g., a file for which one or more write operations have been redirected to a delta file or database as described above.

As indicated in 300, the filter program 50 intercepts a read request. As described above, for example, an application program 45 may call an API of the file system software 30 in order to request to read data at a particular location or offset in the file. In response to the application program 45 calling the API of the file system software 30, the filter program 50 may intercept the read request.

The filter program 50 may determine whether the read request references a file for which input/output virtualization is turned on. For example, as described above, a virtualization management program 47 may have previously called the filter program 50 in order to open a virtualization session for one or more files.

As indicated in 302, if the read request does not reference a file for which input/output virtualization is turned on then the filter program 50 may simply forward the read request to the file system software 30 or allow the read request to pass to the file system software 30 without taking any action. The file system software 30 may then read the requested data from the file in the normal manner.

However, as indicated in 304, if the read request does reference a file for which input/output virtualization is turned on then the filter program 50 may search for change information representing a previous write request to write data at the location referenced by the read request. For example, the filter program 50 may search or analyze the delta file or database where the change information for the file is stored in order to determine whether a portion of change information representing a write request at the specified location in the file exists. As described above, in one embodiment, the change information may be stored in a delta file, and a separate file or database that facilitates looking up change information from the delta file may also be maintained by the filter program 50.

If change information representing a write request at the location or offset specified by the read request is not found in 304 then this indicates that the data in the file at the specified location or offset has not been modified. Thus, the filter program 50 may forward the read request to the file system software 30 or allow the read request to pass to the file system software 30 without taking any action. The file system software 30 may then read the requested data from the file in the normal manner.

Otherwise, if change information representing a previous write request to change data at the specified location in the file is found then the filter program 50 may return the data specified by the change information to the application program 45. Thus, the application program may receive the same data as would have been read if the file itself had been modified in response to the previous write operation, although the data comes from the delta file or change database instead of the file itself.

Some read requests may reference both data that has changed (data at a location for which a write request has previously been received) and data that has not changed. In this case the filter program 50 may read the portion of data that has changed from the delta file or database and may read the portion of data that has not changed from the original file.

It is possible that the filter program 50 may receive multiple write requests requesting to change data at the same location or offset in the file. For example, the filter program 50 may receive a first write request requesting to write data D1 at a location L in the file and may later receive a second write request requesting to write data D2 at the location L in the file. In one embodiment the filter program 50 may search for existing change information representing a previous write operation at the location L before storing new change information representing a new write operation at the location L. If existing change information for the location L is found then it may be overwritten by the new change information.

In another embodiment the existing change information for the location L may not be overwritten, and the new change information may be added to the delta file or database. For example, in one embodiment, a respective portion of change information may be appended onto the end of a delta file for every write request referencing any location in the file, regardless of whether any previous write requests for the respective location have been received. In this embodiment, a read request for data at a given location in the file may be satisfied by reading the data from the most recent change information for that location.

As described above, in some embodiments, data changes may be represented using blocks of a fixed size. If a read operation requests to read an amount of data larger than the size of a single block then the filter program 50 may search for the most recent change information for each block and use that change information to obtain the respective portion of the requested data. If there is no change information for any of the blocks then the original data from the file itself may be read, as described above.

As described above, in some embodiments the filter program 50 may provide an API that allows a virtualization management program 47 or the application program 45 itself to open and close a virtualization session, e.g., to turn on and off the input/output virtualization for a given file. In one embodiment, when a virtualization session is closed, the filter program 50 may automatically delete or purge the delta file or change database so that any change information written during the virtualization session is deleted. In other embodiments the change information written to the delta file or database may be persisted even after the virtualization session is closed. For example, a new virtualization session may be opened at a later time, and data changes recorded in the previous virtualization session may be used to satisfy read requests during the new virtualization session. In one embodiment, the filter program 50 may provide an API enabling the virtualization management program 47 to explicitly cause the change information written to the delta file or database to be deleted if desired.

In one embodiment the filter program 50 may also provide an API enabling the virtualization management program 47 to cause the change information stored in the delta file or database to be applied to the original file or to create a new copy of the file with the changes applied. In one embodiment the filter program 50 may apply the changes by simply issuing a copy command to the file system software 30. In response to the copy command, the file system software 30 may perform read requests to read data from the original file and copy the data to the new file. As described above, the filter program 50 may intercept these read requests and, for blocks of data that have changed, may substitute the data specified by the change information stored in the delta file or database. Thus, the copy command results in a complete copy of the file with all the changes applied.

In further embodiments of the methods described above, a versioning system may be applied in order to effectively maintain different versions or views of a file without requiring a separate copy of the file for each version. For example, in one embodiment the system may be operable to use version IDs, also referred to herein as view IDs, to effectively present multiple views of a file, where each view represents the state of the file at some point or window in time.

Figure 7:
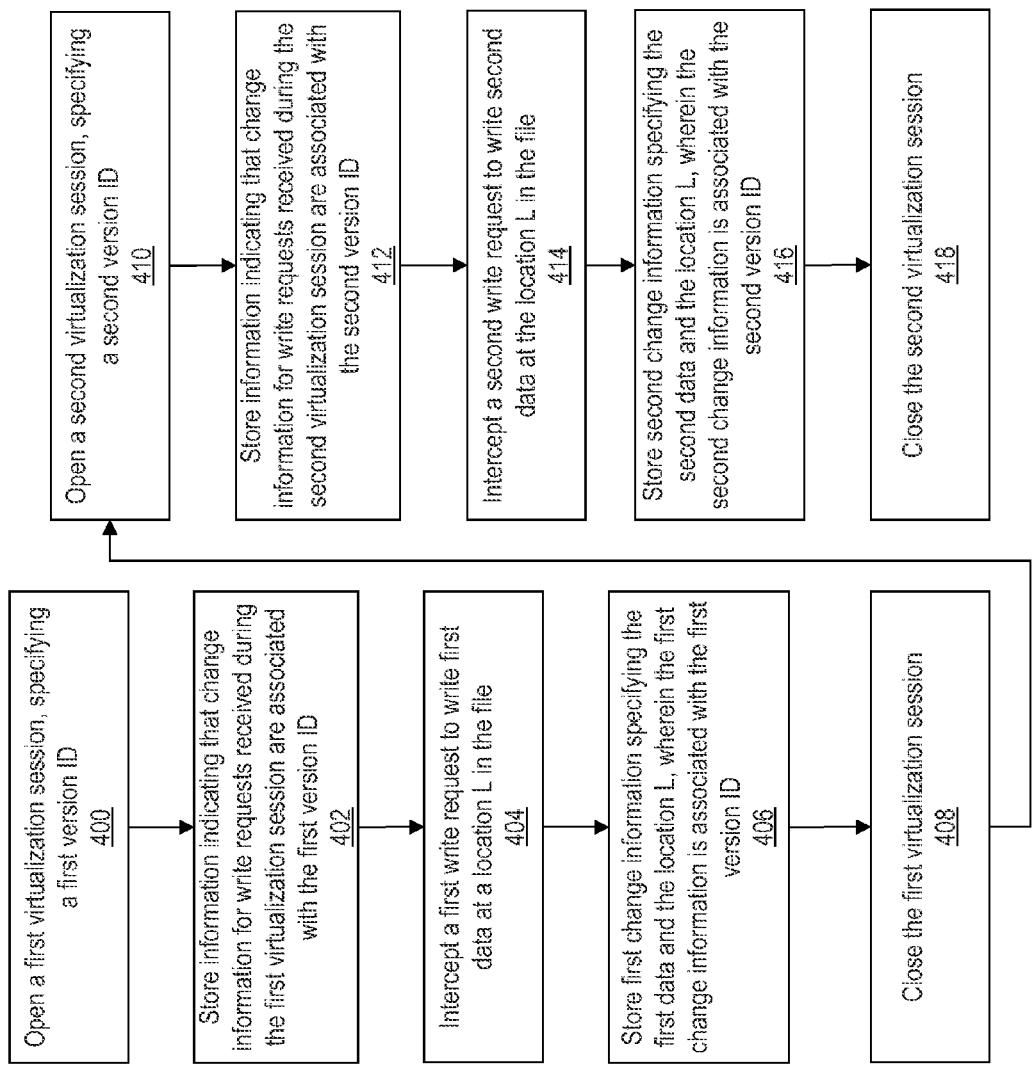
FIGS. 7 and 8 are flowchart diagrams illustrating an example in which two versions or views of a file are represented.

For example, FIG. 7 is a flowchart diagram illustrating an example in which two versions or views of a file are represented. A first version ID represents the state of the file during a first time window, and a second version ID represents the state of the file during a second and later time window.

As indicated in 400, a first virtualization session for the file may be opened, where the first version ID is specified for the first virtualization session. For example, when the virtualization management program 47 calls the filter program 50 to open the first virtualization session for the file, the virtualization management program 47 may pass the first version ID to the filter program 50 as a parameter. As indicated in 402, the filter program 50 may store information indicating that change information for write requests received during the first virtualization session are associated with the first version ID.

In response to receiving a first write request to write first data at a location L in the file, the filter program 50 may store first change information specifying the first data and the location L, as indicated in 404 and 406. The first change information may be associated with the first version ID.

In 408, the first virtualization session may be closed, e.g., in response to the virtualization management program 47 calling the filter program 50 to close the first virtualization session.

Blocks 410-418 indicate a similar sequence of events as blocks 400-408. In 410, a second virtualization session is opened, where a second version ID is specified for the second virtualization session. The filter program 50 may store information indicating that change information for write requests received during the second virtualization session are associated with the second version ID, as indicated in 412. During the second virtualization session, the filter program 50 may intercept a second write request to write second data at the location L in the file, i.e., the same location as specified by the first write request intercepted during the first virtualization session. In response to the second write request, the filter program 50 may store second change information specifying the second data and the location L, where the second change information is associated with the second version ID. In 418 the second virtualization session may be closed.

Thus, two portions of change information indicating a data change at the same location L may be stored, where each portion of change information is associated with a different version ID. The version IDs may be utilized to present different versions or views of the data at the location L within the file, e.g., by setting a version indicator to either the first version ID or second version ID during a subsequent virtualization session and returning data from either the first change information or the second change information accordingly, in response to a read request referencing data at the location L.

Figure 8:
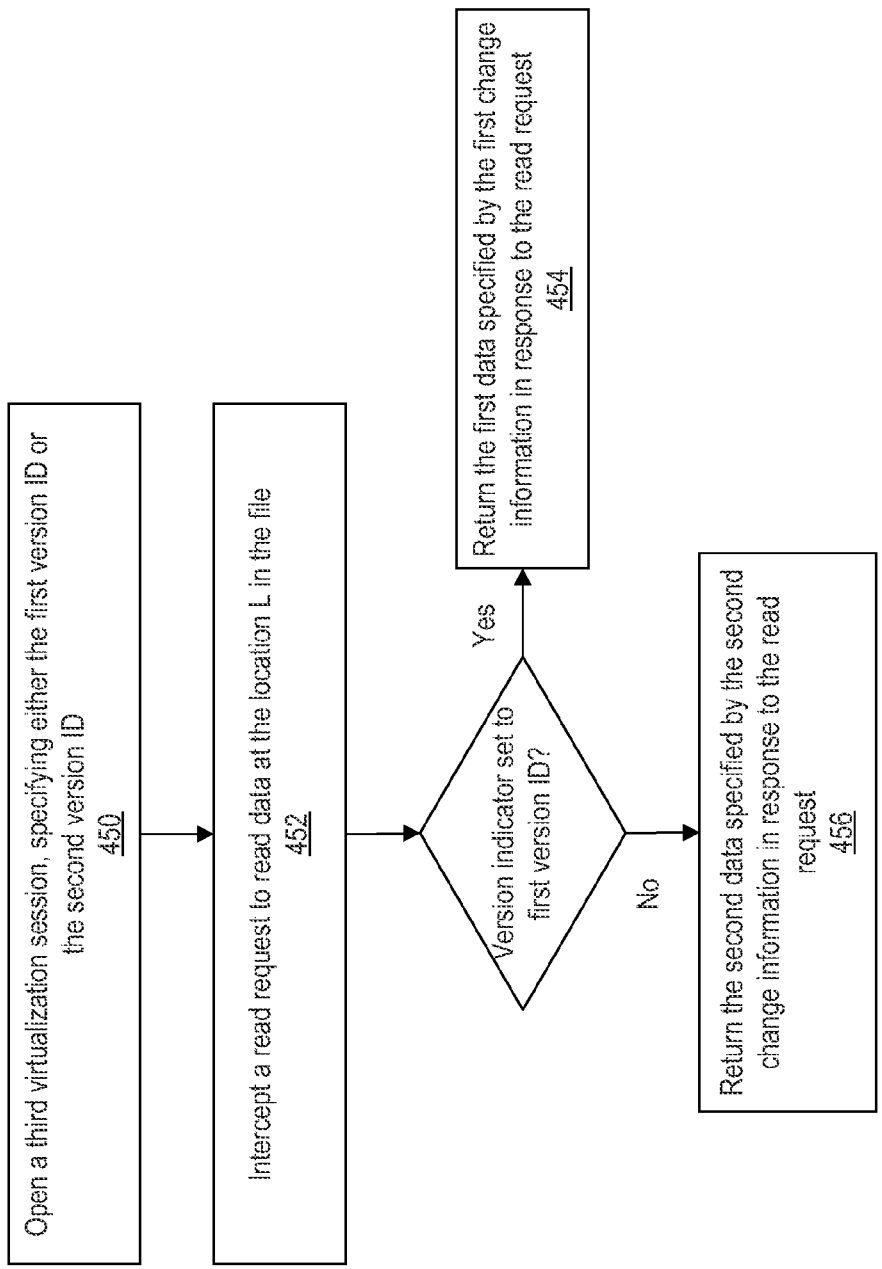

For example, FIG. 8 is a flowchart diagram illustrating an example of reading data at the location L during a subsequent third virtualization session. As indicated in 450, a third virtualization session for the file may be opened. In this example, either the first version ID or the second version ID is passed to the filter program 50 when the third virtualization session is opened. Thus, the filter program 50 may set a current version indicator to either the first version ID or the second version ID. In 452, a read request requesting to read data at the location L in the file is intercepted. As shown in 454, if the version indicator is set to the first version ID (e.g., if the first version ID was passed as a parameter when the third virtualization session was opened) then the filter program 50 may return the first data specified by the first change information in response to the read request. Otherwise, if the version indicator is set to the second version ID then the filter program 50 may return the second data specified by the second change information in response to the read request.

Thus, if the third virtualization session is opened with the first version ID as the version indicator then the filter program 50 may return the first data specified by the first write request intercepted during the first virtualization session in response to the request to read data from the location L in the file. Otherwise, if the third virtualization session is opened with the second version ID as the version indicator then the filter program 50 may return the second data specified by the second write request intercepted during the second virtualization session in response to the request to read data from the location L in the file. Thus, two different versions or views of the file may be presented, depending on the specified version ID.

If the current version indicator is set to the second version ID and a read request is received for another location L1 for which no change information was stored during the second virtualization session then the filter program 50 may determine whether change information for the location L1 was stored during the first virtualization session. If so, then the data specified by the change information stored during the first virtualization session may be returned. Thus, in this example, the second version of the file effectively represents a version that has the same modifications over the original file as the first version, but also with further modifications. Additional versions of the file may be created in addition to the first version and the second version, e.g., so that a chain of versions or views of the file are maintained in a manner similar to that described above.

In addition to this type of linear chain of versions or views of the file, in some embodiments the filter program 50 may enable branching of the versions in a tree-like manner. For example, suppose that a first version of the file and a second version of the file are created as described above. In one embodiment, a third virtualization session may then be opened with the first version ID, and write requests may be received during the third virtualization session. Thus, the two versions no longer represent a linear sequence of versions with respect to time, since new changes are made to the first version of the file, where the new changes may not be reflected in the second version of the file. In this situation the filter program 50 may create a new delta file in order to indicate a branching of the versions. In response to a read request the filter program 50 may first search the new delta file for data that satisfies the read request, and if the data is not found then the filter program 50 may proceed to search the original delta file. The filter program 50 may be operable to create arbitrarily complex trees of versions of the file in this manner.

It is noted that some embodiments of the input/output virtualization method described herein may enable the state of a file at any arbitrary point in time or at any arbitrary point during its history to be accessed or determined. As one example, the method may record a timestamp in association with each change, e.g., may record the time at which each write operation is performed. The timestamps may be used to effectively enable an application program to view or access the state of the file at any arbitrary point in time. For example, the system may provide an API that enables the virtualization management program 47 to specify a particular time. The filter program 50 may utilize the timestamps to satisfy read requests according to the state of the file at the specified time, as described above. Other embodiments of the method may be utilized to represent changes to a file on a continuous basis using any of various other techniques. For example, a different "version" or view of the file may be accessed or represented for each change made to the file.

Figure 9:
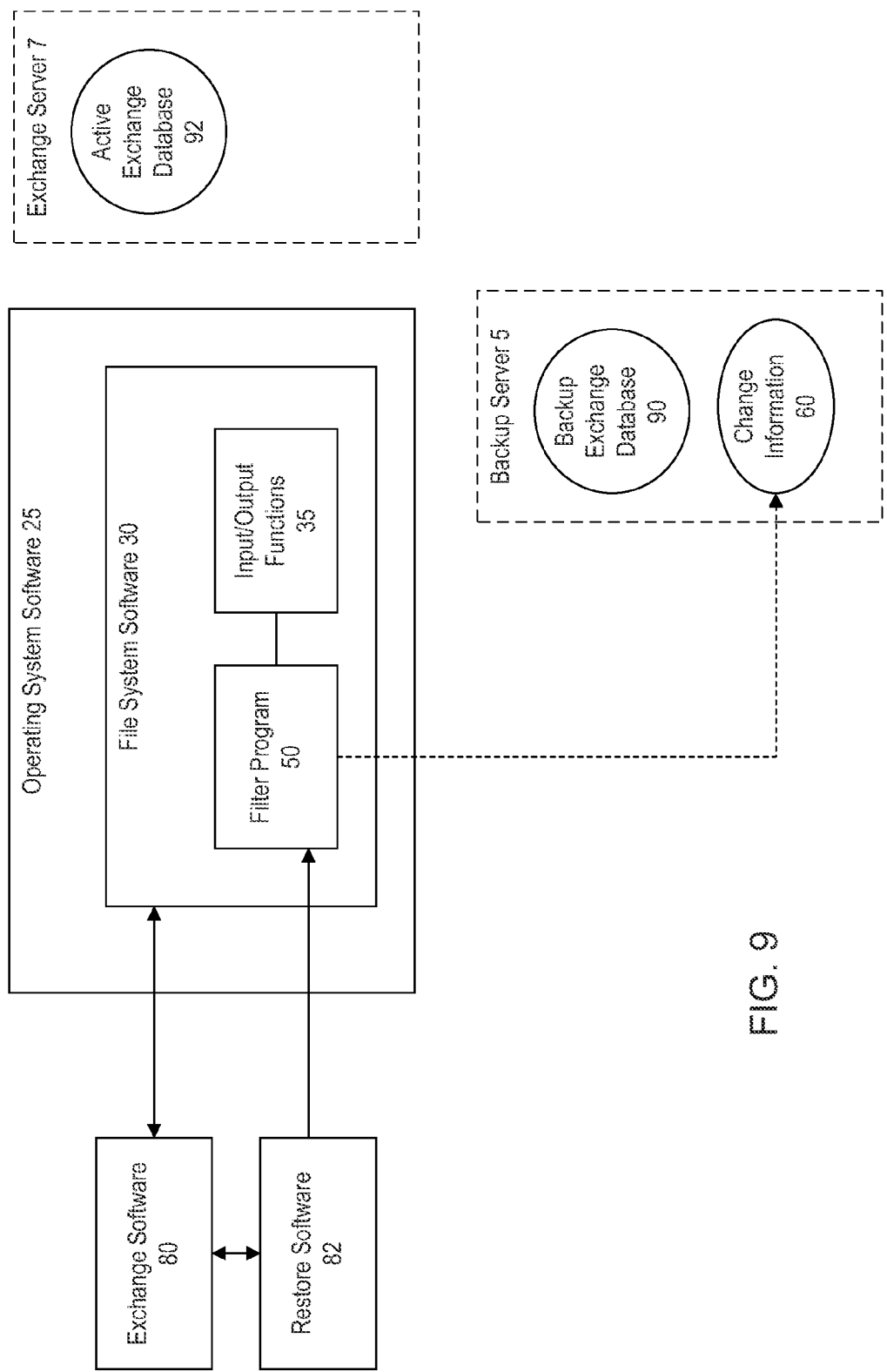
FIG. 9 illustrates an exemplary application in which the input/output virtualization methods described herein are used to restore information in a granular manner from a Microsoft Exchange database.

The methods described above may be used in conjunction with any of various types of application programs in order to provide input/output virtualization for a file. FIG. 9 illustrates an exemplary application in which the methods are used to restore information in a granular manner from a Microsoft Exchange database.

In this example, two computer systems are illustrated, an Exchange server 7 and a backup server 5. The Exchange server 7 stores an active Exchange database 92, e.g., an Exchange database that is currently in use. The backup server 5 stores a backup Exchange database 90, e.g., a copy of the active Exchange database 92 that was created at a previous point in time. For example, the backup Exchange database 90 may be stored on the backup server 5 for backup/recovery purposes so that the backup Exchange database 90 can be used in a disaster recovery scenario in case the active Exchange database 92 becomes corrupted.

In addition to storing the backup Exchange database 90 for disaster recovery purposes in order to restore the entire database if necessary, it may also be desirable to utilize the backup Exchange database 90 to perform restore operations at a more granular level, e.g., in order to restore individual email messages instead of restoring the entire Exchange database. For example, FIG. 9 illustrates restore software 82 that communicates with Microsoft Exchange software 80 in order to restore individual email messages or perform other granular restore operations.

In prior art systems, in order to perform such a granular restore operation using the backup Exchange database 90, the Microsoft Exchange software would perform a process of making the backup Exchange database 90 "consistent", which involves replaying logs that were not committed at the time the active Exchange database 92 was backed up to the backup Exchange database 90. This process of making the backup Exchange database 90 consistent would modify the backup Exchange database 90. However, in this example it is undesirable to modify the backup Exchange database 90 because the original copy of the backup Exchange database 90 may later be needed for use in a complete disaster recovery scenario, as described above.

Thus, in the example of FIG. 9, input/output virtualization such as described above is utilized to avoid modifying the backup Exchange database 90. Before communicating with the Exchange software 80, the restore software 82 may communicate with the filter program 50 to open a virtualization session for each of the one or more files that represent the backup Exchange database 90. The restore software 82 may then communicate with the Exchange software 80 to cause the Exchange software 80 to put the backup Exchange database 90 in a consistent state. The restore software 82 may then communicate with the filter program 50 to close the virtualization session.

After the backup Exchange database 90 has been put in a consistent state, the restore software 82 may be operable to present a graphical user interface enabling an administrator to browse the backup Exchange database 90 to locate the emails or other items to be restored. The restore software 82 may again open a virtualization session for the backup Exchange database 90 and may then present the user interface enabling the administrator to browse the backup Exchange database 90 and select the items of interest to be restored. The selected items are then submitted as restore jobs, and the virtualization session is closed.

The restore software 82 may include a job engine that is notified of the restore jobs that were submitted. The job engine may again open a virtualization session for the backup Exchange database 90 and communicate with the Exchange software 80 in order to restore the selected items from the backup Exchange database 90 to the active Exchange database 92. The job engine may then close the virtualization session.

Thus, write operations which would normally modify the backup Exchange database 90 are instead re-directed so that change information representing the write operations is stored in a delta file or database other than the backup Exchange database 90. This may enable emails or other individual items to be restored in a granular manner without modifying the backup Exchange database 90. This may also avoid the need to create a new copy of what may be a very large backup Exchange database 90 in order to perform the granular restore.

In some embodiments, after creating the initial backup Exchange database 90, incremental backups (e.g., as opposed to full backups of the active Exchange database 92) may be performed to back up incremental changes to the backup Exchange database 90. As described above, the filter program 50 may provide the ability to present multiple versions or views of the backup Exchange database 90, e.g., where a new version or view is created to represent the state of the backup Exchange database 90 after each incremental backup. Thus, the restore software 82 may also allow the administrator to select which view of the backup Exchange database 90 he would like to see when browsing the backup Exchange database 90. This may effectively enable individual items to be restored from different versions or views of the backup Exchange database 90, where each version or view represents the state of the backup Exchange database 90 at a different point in time.

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on any transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
intercepting a read request for a file by a filter program, wherein the read request includes a location in the file from which to read;
searching, by the filter program, for change information related to the file in response to determining that access requests for the file are to be redirected to a change database; and
sending data specified in the change information by the filter program to an application program in response to finding the change information related the file, wherein the change information is indicative of a previous change to the file.

2. The method of claim 1, further comprising forwarding the read request to file system software in response to determining access requests for the file are to be performed directly on the file.

3. The method of claim 1, further comprising forwarding the read request to file system software in response to determining responsive to determining the change information related to the file is not available.

4. The method of claim 1, wherein the change database includes a delta file, and wherein searching, by the filter program, for the change information related to the file includes reading the delta file, wherein the delta file includes pending changes for the file.

5. The method of claim 1, wherein the read request for the file includes a read request for a first portion of the file, and a read request for a second portion of the file.

6. The method of claim 5, wherein sending the data specified in the change information comprises reading the second portion of the file directly from the file in response to determining the second portion of the file has not changed.

7. A non-transitory computer-accessible storage medium having program instructions store therein that, in response to execution by a processor, cause the processor to perform operations comprising:
intercepting a read request for a file, wherein the read request includes a location in the file from which to read;
searching for change information related to the file in response to determining that access requests for the file are to be redirected to a change database; and
sending data specified in the change information to an application program in response to finding the change information related to the file, and wherein the change information is indicative of a previous change the file.

8. The non-transitory computer-accessible storage medium of claim 7, wherein the operations further comprise forwarding the read request to file system software in response to determining access requests for the file are to be performed directly on the file.

9. The non-transitory computer-accessible storage medium of claim 7, wherein the operations further comprise forwarding the read request to file system software responsive to determining in response to determining the change information is not available.

10. The non-transitory computer-accessible storage medium of claim 7, wherein the change database includes a delta file, and wherein searching for the change information related to the file comprises reading the delta file, wherein the delta file includes pending changes for the file.

11. The non-transitory computer-accessible storage medium of claim 7, wherein the location in the file from which to read includes an offset from a beginning of the file.

12. The non-transitory computer-accessible storage medium of claim 7, wherein the read request for the file includes a read request for a first portion of the file, and a read request for a second portion of the file.

13. The non-transitory computer-accessible storage medium of claim 12, wherein sending the data specified in the change information comprises reading the second portion of the file from an original copy in response to determining the second portion of the file has not changed.

14. A system, comprising:
a processor; and
a memory medium storing program instruction;
wherein the processor is operable to execute the program instructions to:
intercept a read request for a file, wherein the read request includes a location in the file from which to read;
search for change information related to the file in response to determining that access requests for the file are to be redirected to a change database; and
send data specified in the change information to an application program in response to finding the change information related to the file, and wherein the change information is indicative of a previous change the file.

15. The system of claim 14, wherein the processor is further operable to execute the program instructions to forward the read request to file system software in response to determining access requests for the file are to be performed directly on the file.

16. The system of claim 14, wherein the operations further comprise forwarding the read request to file system software in response to determining responsive to determining the change information is not available.

17. The system of claim 14, wherein to search for the change information related to the file, the processor is further configured to execute program instructions to reading a delta file, wherein the delta file includes pending changes for the file.

18. The system of claim 14, wherein the location in the file from which to read includes an offset from a beginning of the file.

19. The system of claim 14, wherein the change information includes information indicative of a version of the file.

20. The system of claim 14, wherein to intercept the read request for the file, the processor is further operable to execute the program instructions to detect the application program calling an Application Programming Interface (API) of file system software.

* * * * *